(12) United States Patent
St. Clair et al.

(10) Patent No.: US 11,195,308 B2
(45) Date of Patent: Dec. 7, 2021

(54) PATCHER TOOL

(71) Applicants: Sony Corporation, Tokyo (JP); Sony Pictures Entertainment Inc., Culver City, CA (US)

(72) Inventors: Bret St. Clair, Culver City, CA (US); Marc-Andre Davignon, Culver City, CA (US)

(73) Assignees: Sony Group Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

(21) Appl. No.: 16/654,981

(22) Filed: Oct. 16, 2019

(65) Prior Publication Data
US 2020/0184688 A1   Jun. 11, 2020

Related U.S. Application Data

(60) Provisional application No. 62/775,838, filed on Dec. 5, 2018.

(51) Int. Cl.
*G06T 11/00* (2006.01)
*G06T 3/00* (2006.01)
*G06T 11/60* (2006.01)

(52) U.S. Cl.
CPC .......... *G06T 11/001* (2013.01); *G06T 3/0093* (2013.01); *G06T 11/60* (2013.01)

(58) Field of Classification Search
CPC ..... G06T 3/0093; G06T 11/001; G06T 11/60; G06T 13/40; G06T 15/02; G06T 15/04; G06T 2219/2024
See application file for complete search history.

(56) References Cited

U.S. PATENT DOCUMENTS

| 5,673,377 | A | * | 9/1997 | Berkaloff | G06T 15/04 345/585 |
| 9,672,414 | B2 | | 6/2017 | Sunkavalli et al. | |
| 2013/0121613 | A1 | * | 5/2013 | Winnemoeller | G06T 11/40 382/275 |
| 2016/0328866 | A1 | * | 11/2016 | Neulander | G06T 11/001 |

FOREIGN PATENT DOCUMENTS

CN    108596091 A    9/2018

OTHER PUBLICATIONS

Montesdeoca et al., "Art-directed watercolor stylization of 3D animations in real-time", Elsevier, Computers & Graphics, 2017 (Year: 2017).*

* cited by examiner

*Primary Examiner* — Diane M Wills
(74) *Attorney, Agent, or Firm* — Procopio, Cory, Hargreaves & Savitch, LLP

(57) ABSTRACT

Generating a look of characters using visible brush strokes, including: receiving an input image and a pattern image; replacing each patch in the pattern image with an average color of pixels in the input image corresponding to pixels of each patch to produce a color-averaged output; and applying distortion to the color-averaged output using a distortion image.

19 Claims, 4 Drawing Sheets

PATCHER TOOL

CROSS-REFERENCE TO RELATED APPLICATIONS

This application claims the benefits of priority under 35 U.S.C. § 119(e) of U.S. Provisional Patent Application No. 62/775,838, filed Dec. 5, 2018, entitled "Patcher Tool." The disclosure of the above-referenced application is incorporated herein by reference.

BACKGROUND

Field

The present disclosure relates to animated movies, and more specifically, to creating a look of characters using visible brush strokes in the animated movies.

Background

The basic principles of the "look of picture" for computer graphics (CG) animated movies may include stylizing the skin while maintaining the real world surface properties for the materials and producing a "good look" of the tone and the subsurface. However, the solutions developed for applying graphic details to general surfaces may seem too active and distracting when applied to the face of a character.

SUMMARY

The present disclosure provides for creating a look of characters in animated movies. In one implementation, the look of characters is created by depicting the skin using visible brush strokes.

In one implementation, a system for creating a look of characters using visible brush strokes is disclosed. The system includes: a mosaic generator to receive an input image and a pattern image, the mosaic generator configured to replace each patch in the pattern image with an average color of pixels in the input image corresponding to pixels of each patch to produce a color-averaged output; and a distortion generator to receive the color-averaged output and a distortion image, the distortion generator configured to apply distortion to the color-averaged output.

In one implementation, the system further includes a remapping module configured to apply the distortion using values and signs of R and G channels of the distortion image to remap the screen space UV coordinates. In one implementation, the distortion image includes parameters sufficient to apply a noise pattern to a position path of each patch. In one implementation, the noise pattern is applied by remapping 3-D space UV coordinates of the input image to correspond to R and G channels of the distortion image. In one implementation, the pattern image represents a pattern of the visible brushstrokes with a pattern of solid regions of uniform color. In one implementation, each patch in the pattern image is a uniform color.

In another implementation, a method for generating a look of characters using visible brush strokes is disclosed. The method includes: receiving an input image and a pattern image; replacing each patch in the pattern image with an average color of pixels in the input image corresponding to pixels of each patch to produce a color-averaged output; and applying distortion to the color-averaged output using a distortion image.

In one implementation, applying distortion includes remapping a screen space UV coordinates of the input image. In one implementation, remapping includes applying the distortion using values and signs of R and G channels of the distortion image. In one implementation, the remapping remaps the screen space UV coordinate of the input image to the R and G channels of the distortion image. In one implementation, the distortion image introduces a noise pattern applied to a position path of each patch. In one implementation, the input image is rendered in 3-D. In one implementation, the input image is a frame of a CG animated movie.

In another implementation, an apparatus for generating a look of characters using visible brush strokes is disclosed. The apparatus includes: means for color averaging to receive an input image and a pattern image, and to replace each patch of uniform color in the pattern image with an average color of pixels in the input image corresponding to pixels of each patch to produce a color-averaged output; and means for applying distortion to apply distortion to the color-averaged output using a distortion image.

In one implementation, the means for applying distortion includes means for remapping to remap a screen space UV coordinates of the input image. In one implementation, means for remapping includes means for applying the distortion using values and signs of R and G channels of the distortion image. In one implementation, the means for remapping remaps the screen space UV coordinate of the input image to the R and G channels of the distortion image. In one implementation, the distortion image introduces a noise pattern applied to a position path of each patch. In one implementation, the input image is rendered in 3-D. In one implementation, the input image is a frame of a CG animated movie.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, in CG animated movies, creating an appropriate look of a character (e.g., the skin of the character) can be challenging and there is a need to find a way to be more deliberate in the application of the graphic treatment.

Certain implementations of the present disclosure provide for creating the look of characters using visible brush strokes. In one implementation, a patching application (e.g., the Patcher Tool) provides specific control over breakup to the specification in a way that is subtle but graphic. The look of the characters is then applied to all of the shading components (of the skin) to maintain a more cohesive look. After reading these descriptions, it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

In one implementation, the patching application uses first and second images to create a mosaic, and then a third image to apply distortion to inject a "painterly look or effect" described below. The first image is an input image that is represented as a mosaic (i.e., the image that will be stylized). The second image is a pattern image that represents the pattern of the mosaic (or the pattern of the brushstrokes). The pattern image is an image of the target resolution with some pattern of solid regions of uniform color (within some tolerance). The 'color' channels of the pattern image include positional information in 3-D space (UVs) for the objects rendered in the input image (i.e. the color in the input image is the result of the render, while the color of the pattern image is the position of the object that produced that output pixel during the 3D render).

The patching application receives the input image and the pattern image (made up of a plurality of patches) and replaces each patch of uniform color in the pattern image with an average color of the corresponding pixels in the input image. Thus, the above-described color replacement distorts the patterns by manipulating the shape of the color regions of the input pattern. However, the color replacement alone often produces edges in the resulting image that appear aliased. In one implementation, a third image is used to apply distortion by using the values (and signs) of the R and G channels of the third image to remap the screen space UV coordinates such that the details are pushed or pulled and results resampled.

Figure 1:
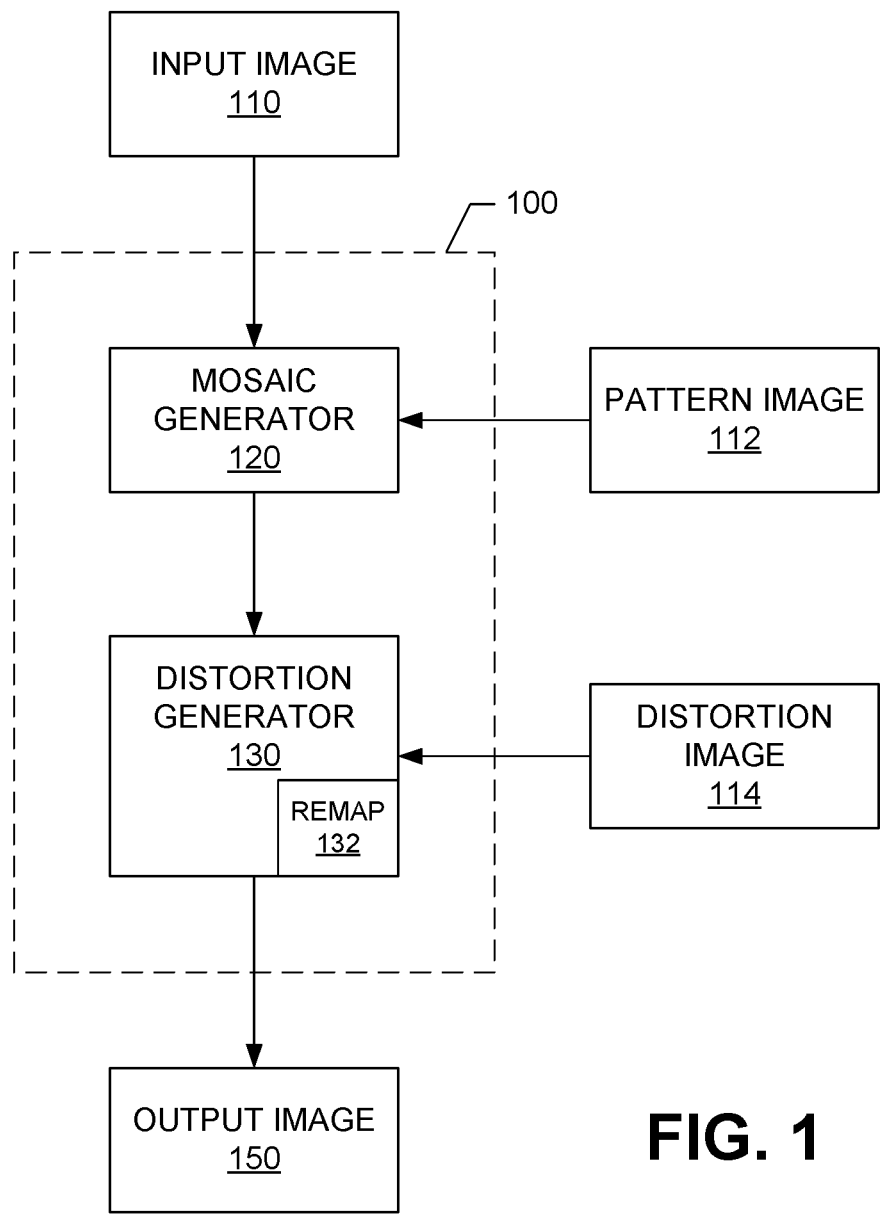
FIG. 1 is a block diagram of a patching system for creating the look of characters using visible brush strokes in accordance with one implementation of the present disclosure.

FIG. 1 is a block diagram of a patching system 100 for creating the look of characters using visible brush strokes in accordance with one implementation of the present disclosure. In one implementation, the patching system 100 receives an input image 110 that was rendered in three dimensions (3-D) (e.g., a CG animated movie) and produces the look of a hand-drawn image using 2-D looking paint strokes. That is, the patching system 100 automates the painting over the 3-D rendered image in the 2-D environment so that it appears as if the image was rendered in 2-D.

In the illustrated implementation of FIG. 1, the patching system 100 includes a mosaic generator 120 and a distortion generator 130. In one implementation, the mosaic generator 120 receives the input image 110 and the pattern image 112 and replaces each patch of uniform color in the pattern image 112 with an average color of pixels in the input image corresponding to pixels of each patch. As described above, the pattern image 112 represents the pattern of the brushstrokes with some pattern of solid regions of uniform color. That is, the mosaic generator 120 uses an average color of a region in the 3-D rendered model of the input image 110 to apply to a corresponding region or patch (i.e., same pixel locations) in the pattern image 112. Thus, the color averaging performed by the mosaic generator 120 has the effect of blurring the smooth color gradient of a patch into a single average color as the patch moves along the frames of the CG animated movie. However, as described above, the color replacement alone often produces edges in the resulting image that appear aliased.

In one implementation, the distortion generator 130 receives the output of the mosaic generator 120, as well as a distortion image 114, and applies the distortion (e.g., random noise) to the output. The application by the distortion generator 130 allows the patches to stay consistent during the movement of the frames and the rendered output to appear even more natural than with color averaging alone. In one implementation, the distortion generator 130 includes a remap module 132 to apply the distortion by using the values (and signs) of the R and G channels of the distortion image 114 to remap the screen space UV coordinates such that the details are pushed or pulled and results resampled. Thus, the distortion image 114 includes parameters sufficient to introduce a noise pattern applied to the position path of the patches by remapping the 3-D space UV coordinates of the input image to correspond to the R and G channels of the distortion image. Accordingly, the distortion generator 130 produces an output image 150 having the look of a hand-drawn image using 2-D paint strokes.

Thus, the mosaic generator 120 uses a variation on the cell noise to create patches from the UVs of the pattern image 112. This introduces variations in patch sizes to simulate a more random (but more human) application of the paint. Since this occurs on the positional data, the resulting paint strokes (generated by the distortion generator 130) track the geometry and not bleed across object boundaries. Each patch output from the mosaic generator 120 is made of a single coordinate, which can be used as an identifier for determining the bounds of a patch in the distortion generator 130. All pixels in a patch are not necessarily connected, but they are related by the source geometry.

Once a patch is identified, the distortion generator 130 receives the texture color source and remaps a discrete set of values into a uniform output color for a given patch, which, in one implementation, is a mean of the color values that make up the patch in the input image 110. For example, the remapping can use the distance from the current pixel as a way to introduce variations of output color within a patch. That is, the notion of range can be introduced as an input value modulated by the users to introduce more variation within larger patches to give a more natural look to the resulting painterly effect.

Figure 2:
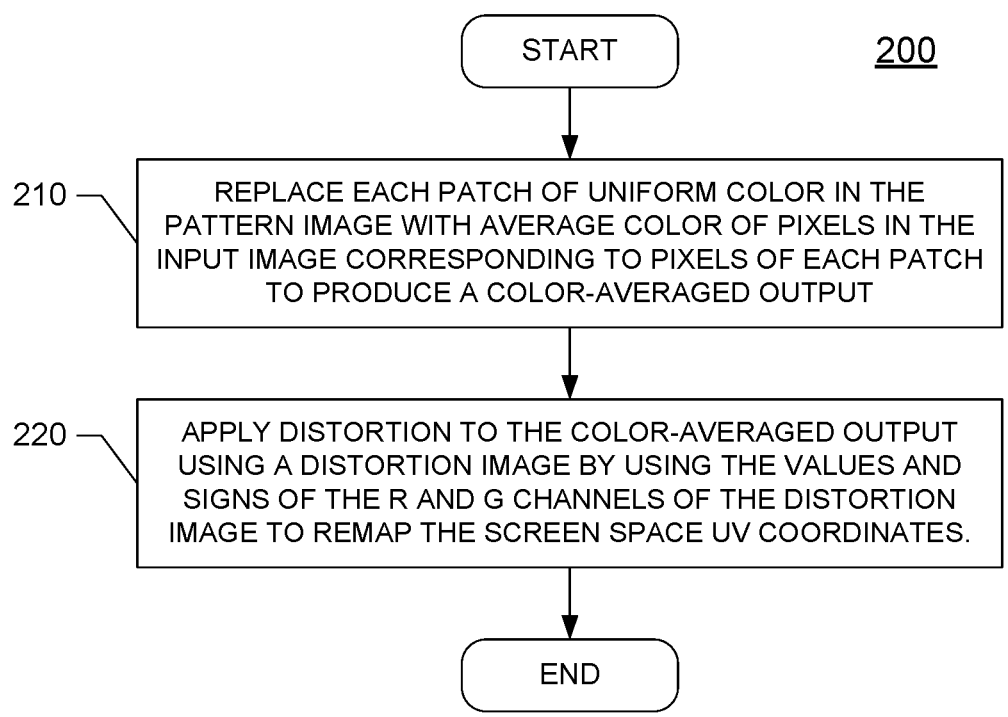
FIG. 2 is a flow diagram of a process for creating the look of characters using visible brush strokes in accordance with one implementation of the present disclosure.

FIG. 2 is a flow diagram of a process 200 for creating the look of characters using visible brush strokes in accordance with one implementation of the present disclosure. In one implementation, the process 200 receives an input image that was rendered in three dimensions (3-D) (e.g., a CG animated movie) and produces the look of a hand-drawn image using 2-D looking paint strokes. That is, the process 200 automates the painting over the 3-D rendered image in the 2-D environment so that it appears as if the image was rendered in 2-D.

In the illustrated implementation of FIG. 2, the process 200 receives the input image and the pattern image and replaces each patch of uniform color in the pattern image with an average color of pixels in the input image corresponding to pixels of each patch, at block 210. As described above, the pattern image represents the pattern of the brushstrokes with some pattern of solid regions of uniform color.

That is, an average color of a region in the 3-D rendered model of the input image is used to apply to a corresponding region or patch (i.e., same pixel locations) in the pattern image to produce a color-averaged output. Thus, the color averaging has the effect of blurring the smooth color gradient of a patch into a single average color as the patch moves along the frames of the CG animated movie. However, as described above, the color replacement alone often produces edges in the resulting image that appear aliased.

In one implementation, the process 200 applies distortion (e.g., random noise), at block 220, to the color-averaged output using a distortion image. In one implementation, the process 200 applies the distortion by using the values (and signs) of the R and G channels of the distortion image to remap the screen space UV coordinates such that the details are pushed or pulled and results resampled. Thus, the distortion image introduces a noise pattern applied to the position path of the patches by remapping the 3-D space UV coordinates of the input image to correspond to the R and G channels of the distortion image. Accordingly, the process 200 produces an output image having the look of a hand-drawn image using 2-D paint strokes.

Figure 3:
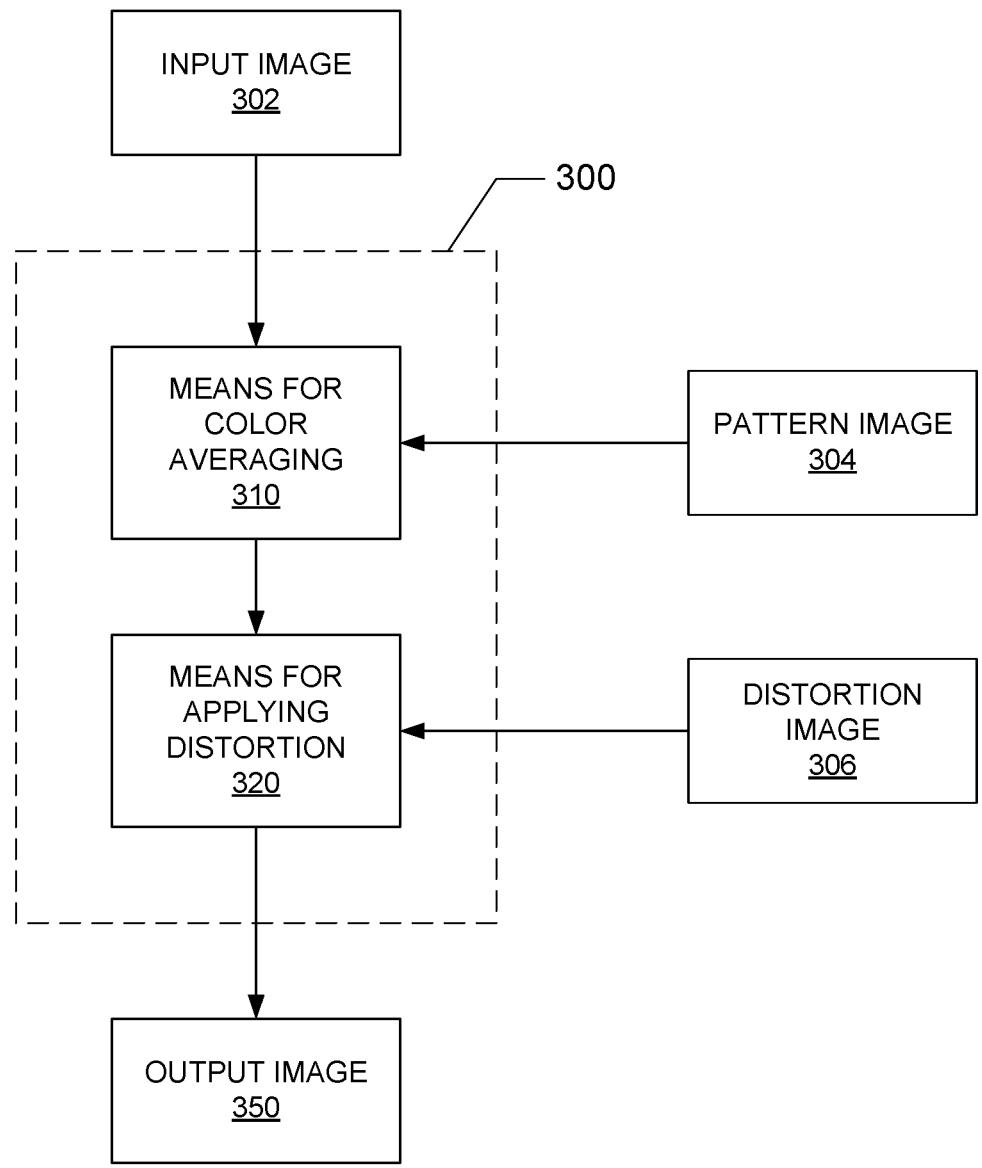
FIG. 3 is a block diagram of an apparatus for creating the look of characters using visible brush strokes in accordance with one implementation of the present disclosure.

FIG. 3 is a block diagram of an apparatus 300 for creating the look of characters using visible brush strokes in accordance with one implementation of the present disclosure. In one implementation, the apparatus 300 receives an input image that was rendered in three dimensions (3-D) (e.g., a CG animated movie) and produces the look of a hand-drawn image using 2-D looking paint strokes. That is, the apparatus 300 automates the painting over the 3-D rendered image in the 2-D environment so that it appears as if the image was rendered in 2-D.

In the illustrated implementation of FIG. 3, the apparatus 300 includes means for color averaging 310 and means for applying distortion 320. In one implementation, the means for color averaging 310 receives the input image 302 and the pattern image 304 and replaces each patch of uniform color in the pattern image 304 with an average color of pixels in the input image corresponding to pixels of each patch. As described above, the pattern image 304 represents the pattern of the brushstrokes with some pattern of solid regions of uniform color.

In one implementation, the means for color averaging 310 uses an average color of a region in the 3-D rendered model of the input image 302 to apply to a corresponding region or patch (i.e., same pixel locations) in the pattern image 304. Thus, the color averaging performed by the means for color averaging 310 has the effect of blurring the smooth color gradient of a patch into a single average color as the patch moves along the frames of the CG animated movie.

In another implementation, the means for color averaging 310 uses a mean color of a region in the 3-D rendered model of the input image 302 to apply to a corresponding region or patch (i.e., same pixel locations) in the pattern image 304. As described above, the pattern image represents the pattern of the brushstrokes with some pattern of solid regions of uniform color. That is, a mean color of a region in the 3-D rendered model of the input image is used to apply to a corresponding region or patch (i.e., same pixel locations) in the pattern image to produce a mean color output. However, as described above, the color replacement alone often produces edges in the resulting image that appear aliased.

In one implementation, the means for applying distortion 320 applies distortion (e.g., random noise) to the color-averaged output using a distortion image 306. In one implementation, the means for applying distortion 320 applies the distortion by using the values (and signs) of the R and G channels of the distortion image to remap the screen space UV coordinates such that the details are pushed or pulled and results resampled. Thus, the distortion image introduces a noise pattern applied to the position path of the patches by remapping the 3-D space UV coordinates of the input image to correspond to the R and G channels of the distortion image. Accordingly, the means for applying distortion 320 produces an output image having the look of a hand-drawn image using 2-D paint strokes.

Figure 4A:
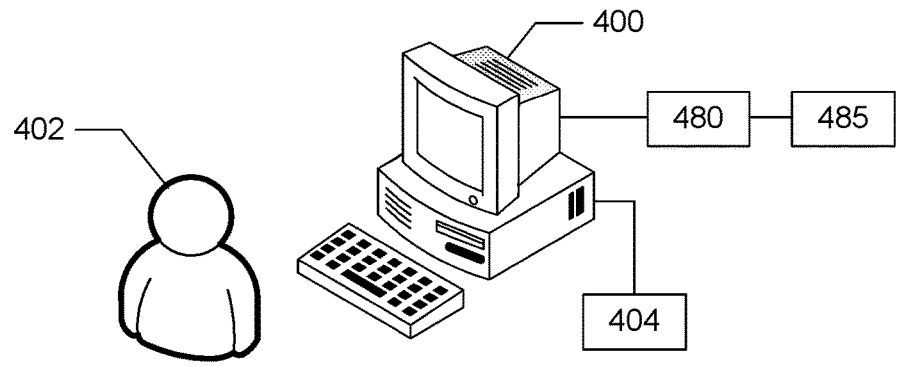
FIG. 4A is a representation of a computer system and a user in accordance with an implementation of the present disclosure.

FIG. 4A is a representation of a computer system 400 and a user 402 in accordance with an implementation of the present disclosure. The user 402 uses the computer system 400 to implement a patching application 490 as illustrated and described with respect to the system 100 of the block diagram shown in FIG. 1 and the process 200 illustrated in FIG. 2.

Figure 4B:
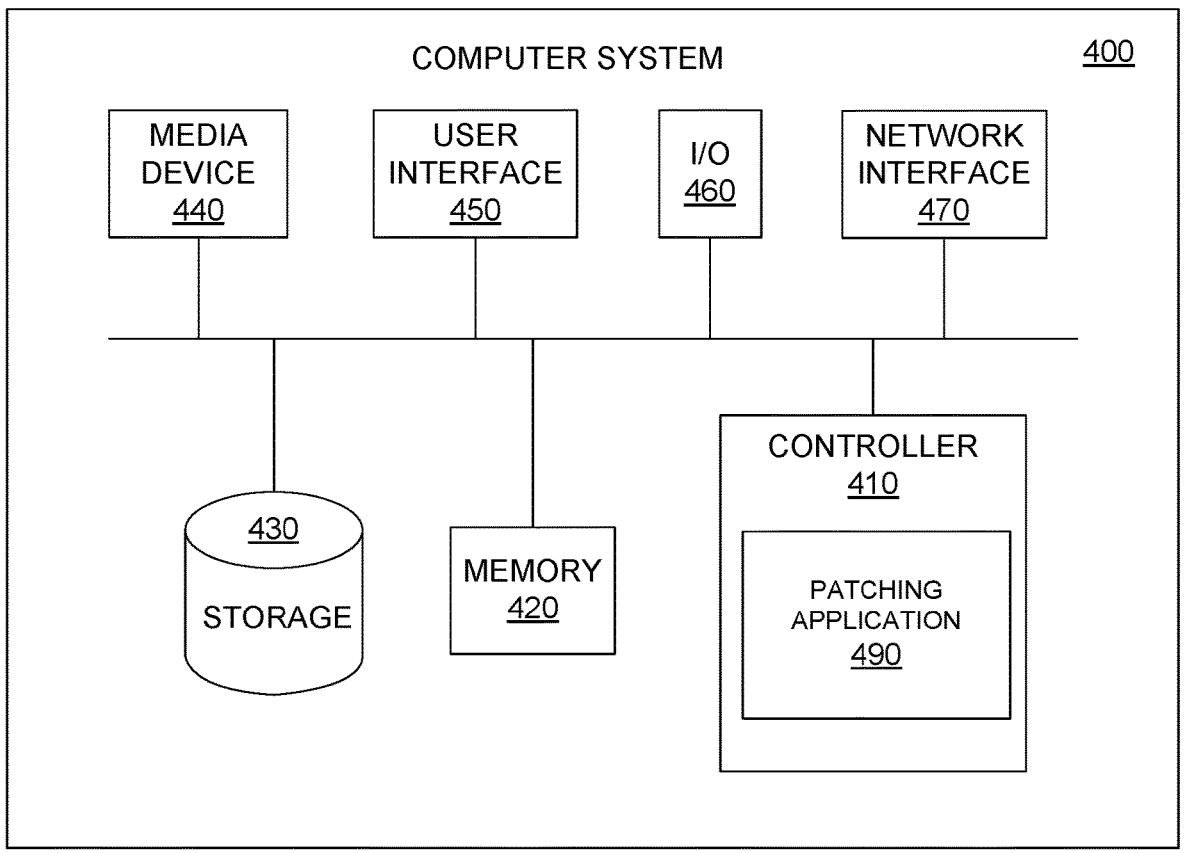
FIG. 4B is a functional block diagram illustrating the computer system hosting the patching application in accordance with an implementation of the present disclosure.

The computer system 400 stores and executes the patching application 490 of FIG. 4B. In addition, the computer system 400 may be in communication with a software program 404. Software program 404 may include the software code for the patching application. Software program 404 may be loaded on an external medium such as a CD, DVD, or a storage drive, as will be explained further below.

Furthermore, computer system 400 may be connected to a network 480. The network 480 can be connected in various different architectures, for example, client-server architecture, a Peer-to-Peer network architecture, or other type of architectures. For example, network 480 can be in communication with a server 485 that coordinates engines and data used within the patching application 490. Also, the network can be different types of networks. For example, the network 480 can be the Internet, a Local Area Network or any variations of Local Area Network, a Wide Area Network, a Metropolitan Area Network, an Intranet or Extranet, or a wireless network.

FIG. 4B is a functional block diagram illustrating the computer system 400 hosting the patching application 490 in accordance with an implementation of the present disclosure. A controller 410 is a programmable processor and controls the operation of the computer system 400 and its components. The controller 410 loads instructions (e.g., in the form of a computer program) from the memory 420 or an embedded controller memory (not shown) and executes these instructions to control the system. In its execution, the controller 410 provides the patching application 490 with a software system, such as to enable the creation and configuration of engines and data extractors within the capture application. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data either temporarily or for long periods of time for use by the other components of computer system 400. For example, storage 430 stores data used by the patching application 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user 402. In one implementation, the user interface 450 includes a keyboard, a mouse, audio speakers, and a display. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

The above-described implementations are used in applications including camera systems for entertainment content, movies, television, personal use, games, security video, and medical imaging.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A system for creating a look of characters using visible brush strokes, the system comprising:
 a mosaic generator to receive an input image that was rendered in 3-D and a pattern image including a pattern of solid regions of uniform color,
 the mosaic generator to replace in a 2-D environment each patch in the pattern image with an average color of pixels in the 3-D input image corresponding to pixels of each patch to produce a color-averaged output image with a look of a hand-drawn image using 2-D looking paint strokes,
 wherein the pattern image represents a pattern of the visible brushstrokes with a pattern of solid regions of uniform color; and
 a distortion generator to receive the color-averaged output image and a distortion image, the distortion generator to apply distortion to the color-averaged output by introducing variations in patch sizes.

2. The system of claim 1, further comprising
 a remapping module to apply the distortion using values and signs of R and G channels of the distortion image to remap the screen space UV coordinates.

3. The system of claim 1, wherein the distortion image includes parameters sufficient to apply a noise pattern to a position path of each patch.

4. The system of claim 3, wherein the noise pattern is applied by remapping 3-D space UV coordinates of the input image to correspond to R and G channels of the distortion image.

5. The system of claim 1, wherein each patch in the pattern image is a uniform color.

6. A method for generating a look of characters using visible brush strokes, the method comprising:
 receiving an input image that was rendered in 3-D and a pattern image including a pattern of solid regions of uniform color,
 wherein the pattern image represents a pattern of the visible brushstrokes with a pattern of solid regions of uniform color;
 replacing in a 2-D environment each patch in the pattern image with an average color of pixels in the 3-D input image corresponding to pixels of each patch to produce a color-averaged output image with a look of a hand-drawn image using 2-D looking paint strokes; and
 applying distortion to the color-averaged output image using a distortion image by introducing variations in patch sizes.

7. The method of claim 6, wherein applying distortion comprises remapping screen space UV coordinates of the input image.

8. The method of claim 7, wherein remapping comprises applying the distortion using values and signs of R and G channels of the distortion image.

9. The method of claim 8, wherein the remapping remaps the screen space UV coordinate of the input image to the R and G channels of the distortion image.

10. The method of claim 6, wherein the distortion image introduces a noise pattern applied to a position path of each patch.

11. The method of claim 6, wherein the input image is rendered in 3-D.

12. The method of claim 6, wherein the input image is a frame of a CG animated movie.

13. An apparatus for generating a look of characters using visible brush strokes, the apparatus comprising:
   means for color averaging to receive an input image that was rendered in 3-D and a pattern image including a pattern of solid regions of uniform color, and
   to replace in a 2-D environment each patch of uniform color in the pattern image with an average color of pixels in the input image corresponding to pixels of each patch to produce a color-averaged output image with a look of a hand-drawn image using 2-D looking paint strokes,
   wherein the pattern image represents a pattern of the visible brushstrokes with a pattern of solid regions of uniform color; and
   means for applying distortion to apply distortion to the color-averaged output image using a distortion image by introducing variations in patch sizes.

14. The apparatus of claim 13, wherein the means for applying distortion comprises
   means for remapping screen space UV coordinates of the input image.

15. The apparatus of claim 14, wherein means for remapping comprises
   means for applying the distortion using values and signs of R and G channels of the distortion image.

16. The apparatus of claim 15, wherein the means for remapping remaps the screen space UV coordinate of the input image to the R and G channels of the distortion image.

17. The apparatus of claim 13, wherein the distortion image introduces a noise pattern applied to a position path of each patch.

18. The apparatus of claim 13, wherein the input image is rendered in 3-D.

19. The apparatus of claim 13, wherein the input image is a frame of a CG animated movie.

\* \* \* \* \*